United States Patent
Takenaga et al.

(10) Patent No.: US 6,516,262 B2
(45) Date of Patent: Feb. 4, 2003

(54) RUNNING CONTROL DEVICE FOR A VEHICLE

(75) Inventors: Hiroshi Takenaga, Tokai-mura (JP); Satoru Kuragaki, Hitachi (JP); Hiroto Morizane, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/790,555

(22) Filed: Feb. 23, 2001

(65) Prior Publication Data

US 2001/0034575 A1 Oct. 25, 2001

(30) Foreign Application Priority Data

Feb. 23, 2000 (JP) ........................................ 2000-052179

(51) Int. Cl.$^7$ ................................................. G06F 7/00
(52) U.S. Cl. ............................... 701/96; 701/28; 701/93; 701/117; 340/907; 342/69; 342/70
(58) Field of Search .............................. 701/96, 93, 24, 701/28, 301, 65, 116, 117, 119; 340/903, 907, 435, 436; 342/70, 69; 180/167

(56) References Cited

U.S. PATENT DOCUMENTS

| 5,926,114 A | * | 7/1999 | Andrews | .................... 340/909 |
| 5,940,010 A | | 8/1999 | Sasaki | ........................ 340/901 |
| 6,278,928 B1 | * | 8/2001 | Agura et al. | .................. 701/65 |

FOREIGN PATENT DOCUMENTS

| DE | 100 28 130 | 12/2000 |
| JP | 3-201100 | 9/1991 |
| JP | 3-260899 | 11/1991 |
| JP | 11-250399 | 9/1999 |

OTHER PUBLICATIONS

*IEEE Intelligent* Systems, Nov.–Dec., 1998, IEEE, USA vol. 13, No. 6, pp. 40–48 entitled "Autonomous driving goes downtown" by Uwe Fanke et al.

* cited by examiner

*Primary Examiner*—Yonel Beaulieu
(74) *Attorney, Agent, or Firm*—Crowell & Moring LLP

(57) ABSTRACT

A cruise control system for an automotive vehicle controls the speed of the vehicle by estimating conditions for not only when the vehicle passes through an intersection but also when a preceding vehicle passes through the intersection, in order to permit travel on an ordinary road with a given following distance. The cruise control system includes a traffic signal characteristics obtaining device for obtaining characteristics of an upcoming traffic signal, a road information obtaining device for obtaining intersection information including a distance to an intersection, an intersection arrival time calculating device for calculating arrival timing of the vehicle and the preceding vehicle on the basis of a distance to the intersection, the vehicle speed and the preceding vehicle traveling conditions, a traffic signal condition estimating device for estimating the condition of the traffic signal on the basis of the traffic signal characteristics and the intersection arrival timing, and a control content modifying device for modifying the content of the cruise control of the vehicle depending upon the estimated traffic signal condition.

14 Claims, 11 Drawing Sheets

FIG. 17

| CONDITION | CONTROL MODE | |
|---|---|---|
| | R/L=0 (STRAIGHT) | R/L=1 OR 2 (RIGHT TURN, LEFT TERN) |
| (1) | MAINTAIN DISTANCE CONTROL, USE SPEED COMMAND $V_{cmd}$ | DECELERATION OPERATION, USE SPEED COMMAND $V_{cop}$ |
| (2) | DECELERATION OPERATION, USE SPEED COMMAND $V_{cop}$ | DECELERATION OPERATION, USE SPEED COMMAND $V_{cop}$ |
| (3) | DECELERATION OPERATION, USE SPEED COMMAND $V_{cop}$ | DECELERATION OPERATION, USE SPEED COMMAND $V_{cop}$ |
| (4) | MAINTAIN DISTANCE CONTROL, USE SPEED COMMAND $V_{cmd}$ | DECELERATION OPERATION, USE SPEED COMMAND $V_{cop}$ |
| (5) | DECELERATION OPERATION, USE SPEED COMMAND $V_{cop}$ | DECELERATION OPERATION, USE SPEED COMMAND $V_{cop}$ |
| (6) | DECELERATION OPERATION, USE SPEED COMMAND $V_{cop}$ | DECELERATION OPERATION, USE SPEED COMMAND $V_{cop}$ |
| (7) | DECELERATION OPERATION, USE SPEED COMMAND $V_{cop}$ | DECELERATION OPERATION, USE SPEED COMMAND $V_{cop}$ |
| (8) | DECELERATION OPERATION, USE SPEED COMMAND $V_{cop}$ | DECELERATION OPERATION, USE SPEED COMMAND $V_{cop}$ |
| (9) | MAINTAIN DISTANCE CONTROL, USE SPEED COMMAND $V_{cmd}$ | DECELERATION OPERATION, USE SPEED COMMAND $V_{cop}$ |
| (10) | MAINTAIN DISTANCE CONTROL, USE SPEED COMMAND $V_{cmd}$ | DECELERATION OPERATION, USE SPEED COMMAND $V_{cop}$ |
| (11) | MAINTAIN DISTANCE CONTROL, USE SPEED COMMAND $V_{cmd}$ | DECELERATION OPERATION, USE SPEED COMMAND $V_{cop}$ |
| (12) | MAINTAIN DISTANCE CONTROL, USE SPEED COMMAND $V_{cmd}$ | DECELERATION OPERATION, USE SPEED COMMAND $V_{cop}$ |

RUNNING CONTROL DEVICE FOR A VEHICLE

BACKGROUND OF THE INVENTION

The present invention relates generally to a running control device for a vehicle. More particularly, the invention relates to a cruise control system for an automotive vehicle which can perceive a condition of coming traffic signal installed on a road, on which the own vehicle travels, and appropriately control a speed of the own vehicle and a distance to a preceding vehicle.

According to advancement of performance of automotive vehicle, it has been more important to provide preventive security by recognizing environmental condition, in which own vehicle travels for detecting a condition where accident tends to occur, to given an alarm to a driver for encouraging taking operation for avoiding danger and preventing accident before occurring by automatically controlling the vehicle in positive manner.

More particularly, an automatic cruise control systems which measures a distance to a preceding vehicle traveling ahead of own vehicle using a laser radar or a millimeter wave radar for cruising with controlling the distance constant, have been commercialized. While such systems are premised on use on the highway, application of such system for traveling on ordinary roads toward the future.

Therefore, as prior arts, systems disclosed in Japanese Patent Application Laid-Open No. 3-201100(1991), Japanese Patent Application Laid-Open No. 3-260899(1991) and Japanese Patent Application Laid-Open No. 11-250399 (1999). The conventional system disclosed in Japanese Patent Application Laid-Open No. 3-20110 recognizes condition of a traffic signal by image processing to announce a condition of the traffic signal to the driver when the own vehicle reaches a position of a predetermined distance to the traffic signal, and causes deceleration of the vehicle at red light. On the other hand, the conventional system disclosed in Japanese Patent Application Laid-Open No. 3-260899 has means for detecting color information of the traffic signal to stop operation of distance control when a color of the detected traffic signal is a predetermined color.

On the other hand, the conventional system disclosed in Japanese Patent Application Laid-Open No. 11-250399 receives a distance to an intersection and a condition of the traffic signal from a on-road equipment distanced from the intersection for a predetermined distance, and performs control.

On the other hand, in the conventional system, a condition of the traffic signal is estimated the condition of the traffic signal when the own vehicle passes through the intersection on the basis of the received distance to the intersection and a speed of the own vehicle and makes judgment whether the own vehicle can stop at the intersection at a predetermined deceleration characteristics. Then, when the own vehicle can stop at the intersection at the predetermined deceleration characteristics but cannot pass through the intersection safely, an alarm is given to the driver. On the other hand, when the own vehicle cannot stop at the intersection at the predetermined deceleration characteristics, an alarm is given to the driver even when the own vehicle can pass the intersection safely.

However, in the conventional automatic cruise control system, upon traveling on the ordinary road, various drawbacks are encountered. Namely, since the automatic cruising system measures only distance, if the preceding vehicle passes through the intersection at yellow light or red light, the own vehicle can follow the preceding vehicle despite of the fact that the traffic signal is red light.

On the other hand, since deceleration is taken place only in consideration of the condition of the traffic signal when the own vehicle passes through the intersection, unnecessary deceleration can be caused, and deceleration with taking stoppage of the preceding vehicle into account cannot be performed. Therefore, more delicate vehicle distance control cannot be performed.

SUMMARY OF THE INVENTION

The present invention has been worked out in view of the problems set forth above. Therefore, it is an object of the present invention to provide a cruise control system for an automotive vehicle to control speed of own vehicle estimating conditions not only when the own vehicle passes through the intersection but also when the preceding vehicle passes through the intersection, for permitting travel on the ordinary road with a given distance.

In order to accomplish the above-mentioned object, a cruise control system for an automotive vehicle, according to one aspect of the present invention, for controlling cruising of own vehicle with maintaining a distance to a preceding vehicle constant, comprises:

traffic signal characteristics obtaining means for obtaining characteristics of a traffic signal ahead;

road information obtaining means for obtaining intersection information including a distance to an intersection;

intersection arrival time calculating means for calculating arrival timing of the own vehicle and the preceding vehicle on the basis of a distance to the intersection, an own vehicle speed and a preceding vehicle traveling condition;

traffic signal condition estimating means for estimating the condition of the traffic signal on the basis of the traffic signal characteristics and the intersection arriving time; and control content modifying means for modifying a content of cruise control of the own vehicle depending upon the estimated traffic signal condition.

On the other hand, in the cruise control system for an automotive vehicle may further comprise right and left turn control signal generating means for generating operation pattern of the own vehicle from a state of turn signal or a route information to a destination generated by the road information obtaining means to input to the control content modifying means.

The traffic signal characteristics obtaining means may include traffic signal characteristics measuring means for measuring characteristics of the traffic signal and traffic signal characteristics learning means for learning a traffic signal characteristics measured by the traffic signal characteristics measuring means.

The traffic signal characteristics learning means may learn intersection information from the road information obtaining means with correspondence to the intersection information.

According to another aspect of the present invention, a cruise control system for an automotive vehicle, for controlling cruising of own vehicle with maintaining a distance to a preceding vehicle constant, comprises:

traffic signal characteristics obtaining means including image pick-up means having zooming means, image processing means obtaining a traffic signal characteristics by processing an image of the image pick-up means and communication means, for serving as measuring means for obtaining characteristics of a traffic signal ahead;

road information obtaining means for obtaining intersection information including a distance to an intersection ahead;

intersection arrival time calculating means for calculating arrival timing of the own vehicle and the preceding vehicle on the basis of a distance to the intersection, an own vehicle speed and a preceding vehicle traveling condition;

traffic signal condition estimating means for estimating the condition of the traffic signal on the basis of the traffic signal characteristics and the intersection arriving time;

right and left turn control signal generating means for generating operation pattern of the own vehicle from a state of turn signal or a route information to a destination generated by the road information obtaining means to input to the control content modifying means;

control content modifying means for modifying a content of cruise control of the own vehicle depending upon the estimated traffic signal condition; and alarm means for generating a corresponding alarm beforehand of modifying the content of control.

On the other hand, the cruise control system for the automotive vehicle has communication means for obtaining the traveling condition of the preceding vehicle from outside. On the basis of the traveling condition (distance and relative speed) of the preceding vehicle obtained via the communication means, the intersection arriving time of the preceding vehicle and the signal condition (red, green or yellow) at arrival timing are estimated to perform vehicle control. Here, the traveling condition of the preceding vehicle from the communication means may be the traveling condition of one or more preceding vehicle.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 17 is an explanatory illustration of a control mode of control content modifying means.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
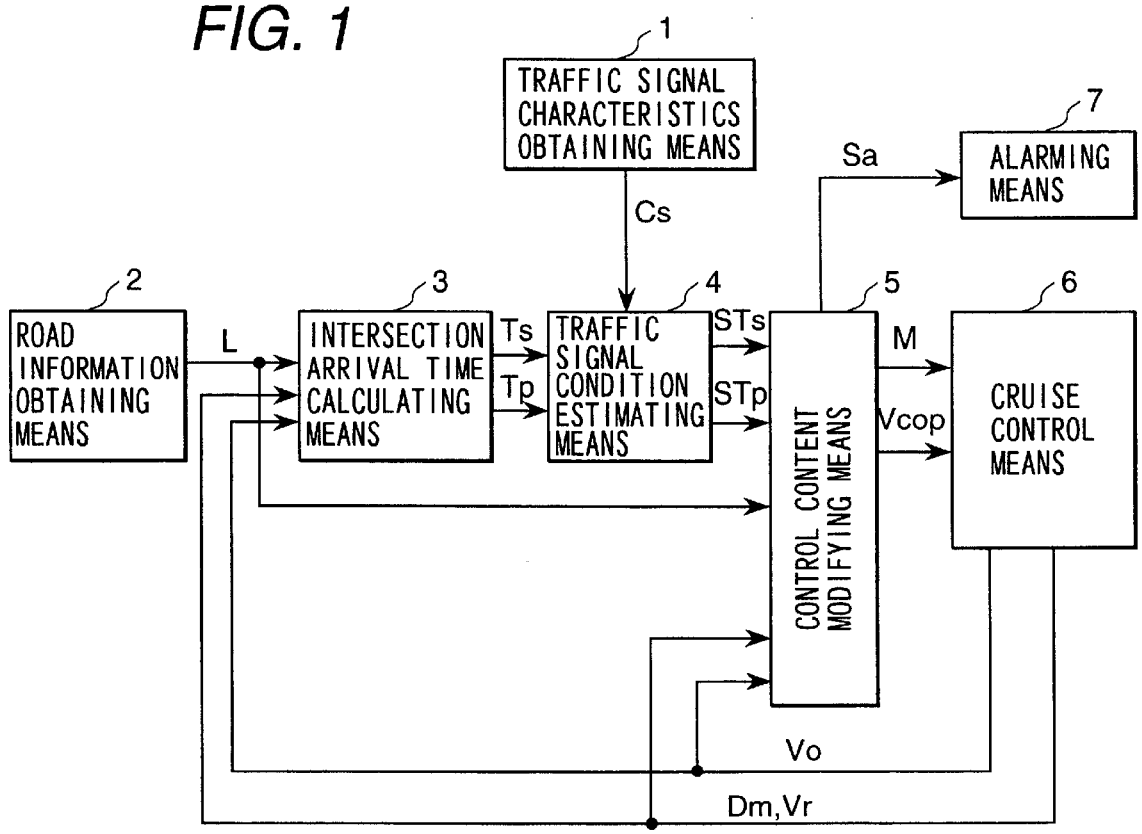
FIG. 1 is a block diagram showing a functional construction of one embodiment of a cruise control system for an automotive vehicle according to the present invention.

FIG. 1 shows a block diagram of one embodiment of a cruise control system for an automotive vehicle. The shown embodiment of the cruise control system for the automotive vehicle is constructed with traffic signal characteristics obtaining means 1, road information obtaining means 2, intersection arriving time calculating means 3, traffic signal condition estimating means 4, control content modifying means 5, cruise control means 6 and alarm means 7, in general.

Figure 2:
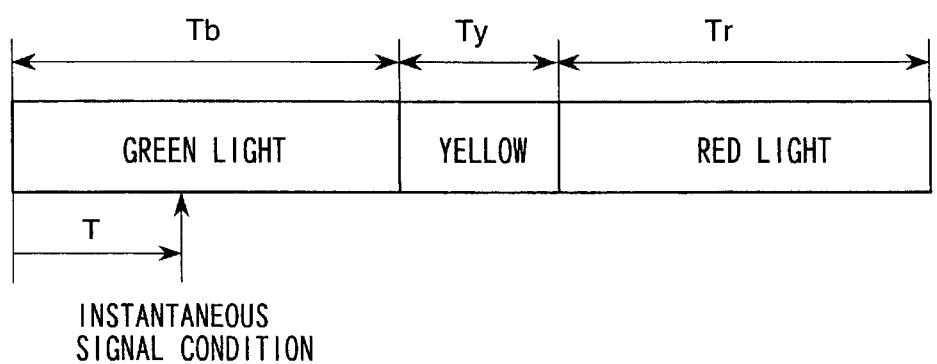
FIG. 2 is an explanatory illustration for the case of obtaining a traffic signal characteristics.

The traffic signal characteristics obtaining means 1 is constructed with image pick-up means (101) for picking up an image of a traveling direction of an own vehicle, and image processing means (102, see FIG. 12) for processing the image picked up by the image pick-up means (101), for example. By executing processing procedure which will be discussed later, characteristics Cs of the traffic signal (red light period Tr, green light period Tb, yellow light period Ty and an elapsed time T from beginning of a signal condition cycle to a current time) shown in FIG. 2 is obtained to output to the traffic signal condition predicting means 4.

Here, the characteristics Cs of the traffic signal obtained by traffic signal characteristics obtaining means 1 is the red light period Tr, the green light period Tb, the yellow light period Ty and the elapsed time T from beginning of the cycle to the current time as taking green, yellow and red light periods as one cycle. The traffic signal characteristics obtaining means can be realized by the image pick-up device, such as a TV camera, and an image processing device, for example, can recognize the traffic signal by processing the image picked up by the image processing device and can measure the green light period, the yellow light period and the read light period with correspondence to the current time. In the alternative, the red light period, the green light period and the yellow light period can be obtained from the traffic signal provided on the road, the control unit or other on-road equipment through communication means.

Figure 3:
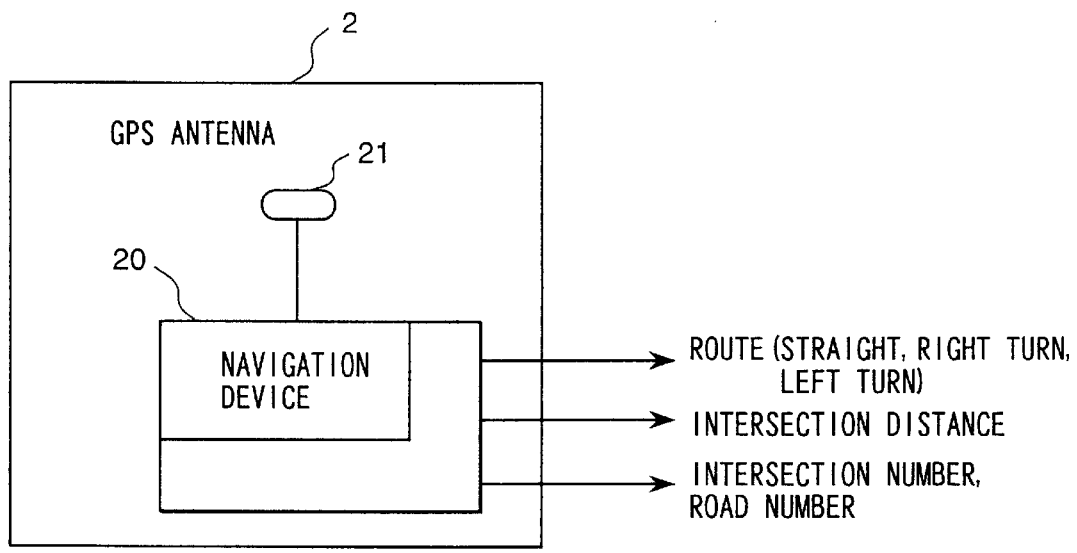
FIG. 3 is a block diagram showing a construction of road information obtaining means.

On the other hand, the road information obtaining means 2 can be realized by employing a navigation device as means for calculating a distance L to an intersection, to which an own vehicle is approaching, using an own position obtained by GPS or the like and a road map. The road information obtaining means 2 can be constructed with the navigation device 20 utilizing GPS as shown in FIG. 3 and a GPS antenna 21, for example. Namely, a traveling position of the own vehicle is derived utilizing the GPS to discriminate a road on which the own vehicle is traveling and an intersection, to which the own vehicle is approaching by establishing correspondence between the derived traveling position and the road map stored in the navigation device 20, to calculate a distance L to the intersection, to which the own vehicle is approaching is calculated from information, such as shape of the road or so forth stored in the road map. Since the discriminated road and the intersection are stored in the road map with assigning unique numbers, the road number and the intersection number can be output together with the discriminated road and the intersection.

When a route calculating function is provided in the navigation device, an optimal route from a starting point to a destination can be calculated, Therefore, on the basis of the route calculated, information to go straight, to turn right or to turn left can also be output.

The intersection arriving time calculating means 3 estimates timings to arrive the intersection of the own vehicle and the preceding vehicle, using the distance to the intersection, an own vehicle speed and traveling condition of the preceding vehicle (distance and relative speed). Now, assuming that a distance to the intersection output from the road information obtaining means 2 is L, an own vehicle speed output by the cruise control means 6 is V0, the distance to the preceding vehicle is Dm and a relative speed with the preceding vehicle is Vr, a timing Ts and Tp of arrival to the intersection of the own vehicle and the preceding vehicle are estimated by the following equation to output to the traffic signal condition estimating means 4.

$$Ts=L/Vo$$

$$Tp=(L-Dm)/Vs$$

$$Vs=Vo+Vr$$

Figure 4:
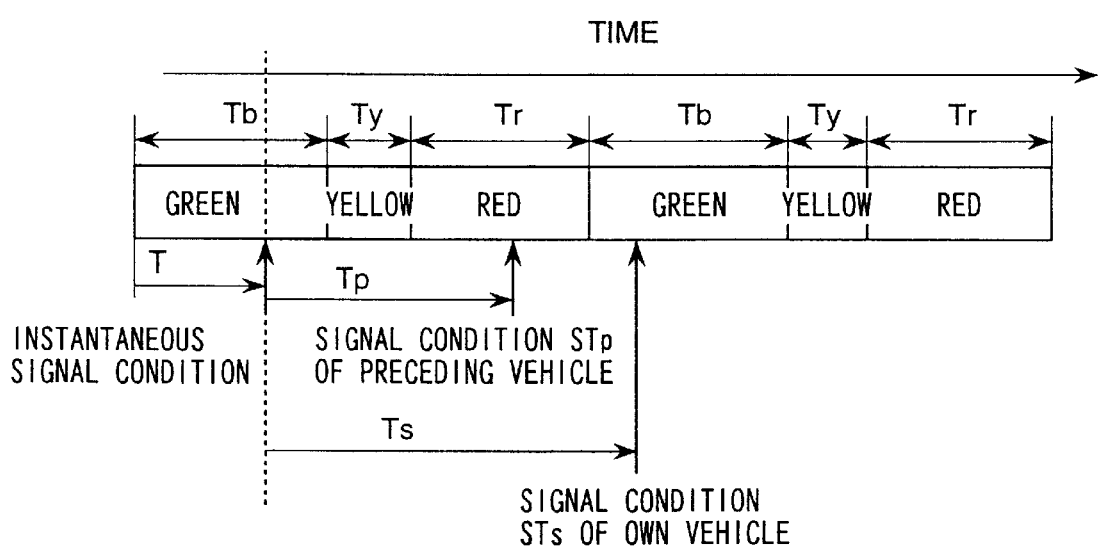
FIG. 4 is an explanatory illustration of a traffic signal condition estimating method.

On the other hand, traffic signal condition estimating means 4 estimates the signal condition (green light, yellow light or red light) upon arrival to the intersection of the own vehicle and the preceding vehicle on the basis of timing of arrival to the intersection of the own vehicle and the preceding vehicle and the traffic signal characteristics (red light period Tr, green light period Tb, yellow light period Ty and an elapsed time T from beginning of a signal condition cycle to a current time). Then, the traffic signal condition estimating means 4 estimates conditions STs and STp of the traffic signal upon arrival of the own vehicle and the preceding vehicle as shown in FIG. 4 using the characteristics Cs of the traffic signal output by the traffic signal characteristics obtaining means 1 and intersection arriving timing Ts and Tp of the own vehicle and the preceding vehicle output by the intersection arriving time calculating means 3. In an example of FIG. 4, there is shown that when the preceding vehicle arrives the intersection, the traffic signal is a red light condition Tr, and when the own vehicle arrives the intersection, the traffic signal is a blue light condition Tb.

The control content modifying means 5 controls traveling of vehicle by making judgment whether a distance control is to be continued or to perform decelerating operation depending upon a deceleration characteristics according to a distance to the intersection and the own vehicle speed depending upon the estimated condition of traffic signal (green light, yellow light or red light) upon arrival to the intersection of the own vehicle and the preceding vehicle. On the other hand, it is also possible to modify the decelerating operation depending upon the signal condition (green light, yellow light or red light) upon arrival to the intersection of the own vehicle and the preceding vehicle. A traveling control mode M and a speed command Vcop are output on the basis of the estimated traffic signal conditions STs and STp output by the traffic signal condition estimating means 4, a distance to the intersection L output by the road information obtaining means 3 and the own vehicle speed V0 output by the cruise control means 6. Furthermore, when a traveling control mode is varied, a control signal Sa for generating an alarm notifying the variation of the traveling control mode to output to the alarm means 7.

The alarm means 7 provides an alarm to the driver by sound, light, vibration or the like before modification of the control content in practice.

Figure 5:
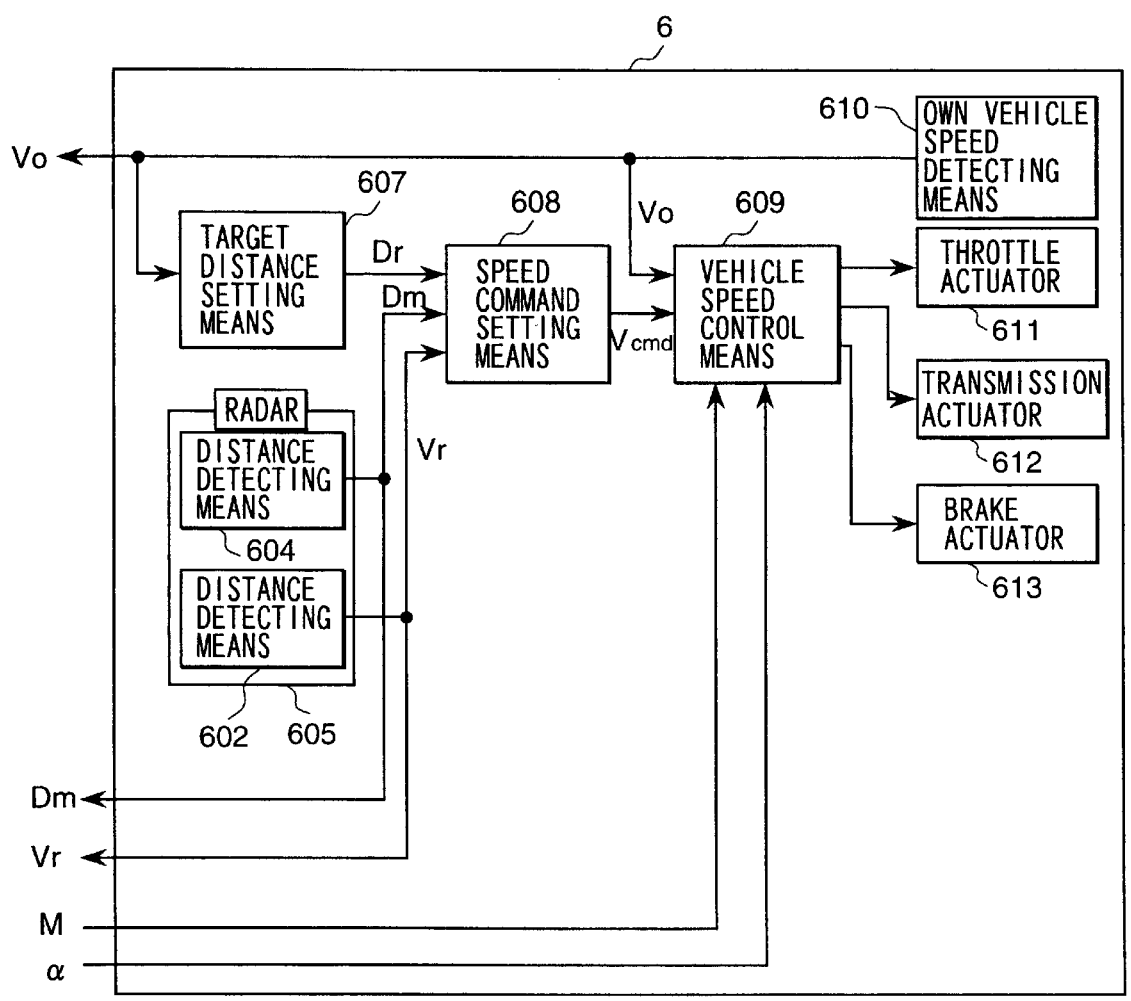
FIG. 5 is a block diagram showing a construction of the cruise control system for the automotive vehicle.

The cruise control means 6 is a control device for driving the own vehicle to travel with maintaining the distance to the preceding vehicle constant, and is constructed as shown in FIG. 5, for example. The cruise control means 6 includes a radar 605 having a target distance (Dr) setting means 607, a relative speed (Vr) detecting means 602, a distance (Dm) detecting means 604, a speed command (Vcmd) setting means 608, a vehicle speed control means 609, an own vehicle speed detecting means 610, a throttle actuator 611, a transmission actuator 612 and a brake actuator 613.

As the own vehicle speed detecting means 610 detecting the own vehicle speed Vo, a wheel speed sensor detecting a vehicle speed from a rotation speed of the wheel may be employed, for example. The radar is constructed with a millimeter wave radar for example and has own vehicle speed detecting means and relative speed detecting means 602 for measuring and outputting respective of the distance Dm and the relative speed Vr.

The target distance setting means 607 sets a target distance Dr on the basis of the own vehicle speed Vo detected by the own vehicle speed detecting means 610.

In the speed command setting means 608, a speed command Vcmd is set on the basis of the target distance Dr, the measured distance Dm and the measured relative speed Vr.

The vehicle speed control means 609 derives a throttle valve open degree command, a shift command and a brake command on the basis of the own vehicle speed Vo, the speed command Vcmd, the distance Dm, the relative speed Vr, the control mode M and the speed command Vcop to control the throttle actuator 611, the transmission actuator 612 and the brake actuator 613.

Here, the control content modifying means 5, the target distance setting means 607, the speed command setting means 608 and the vehicle speed control means 609 may be realized by executing respectively corresponding control programs by a computer, for example. A process corresponding to respective control programs will be discussed hereinafter in detail.

Figure 6:
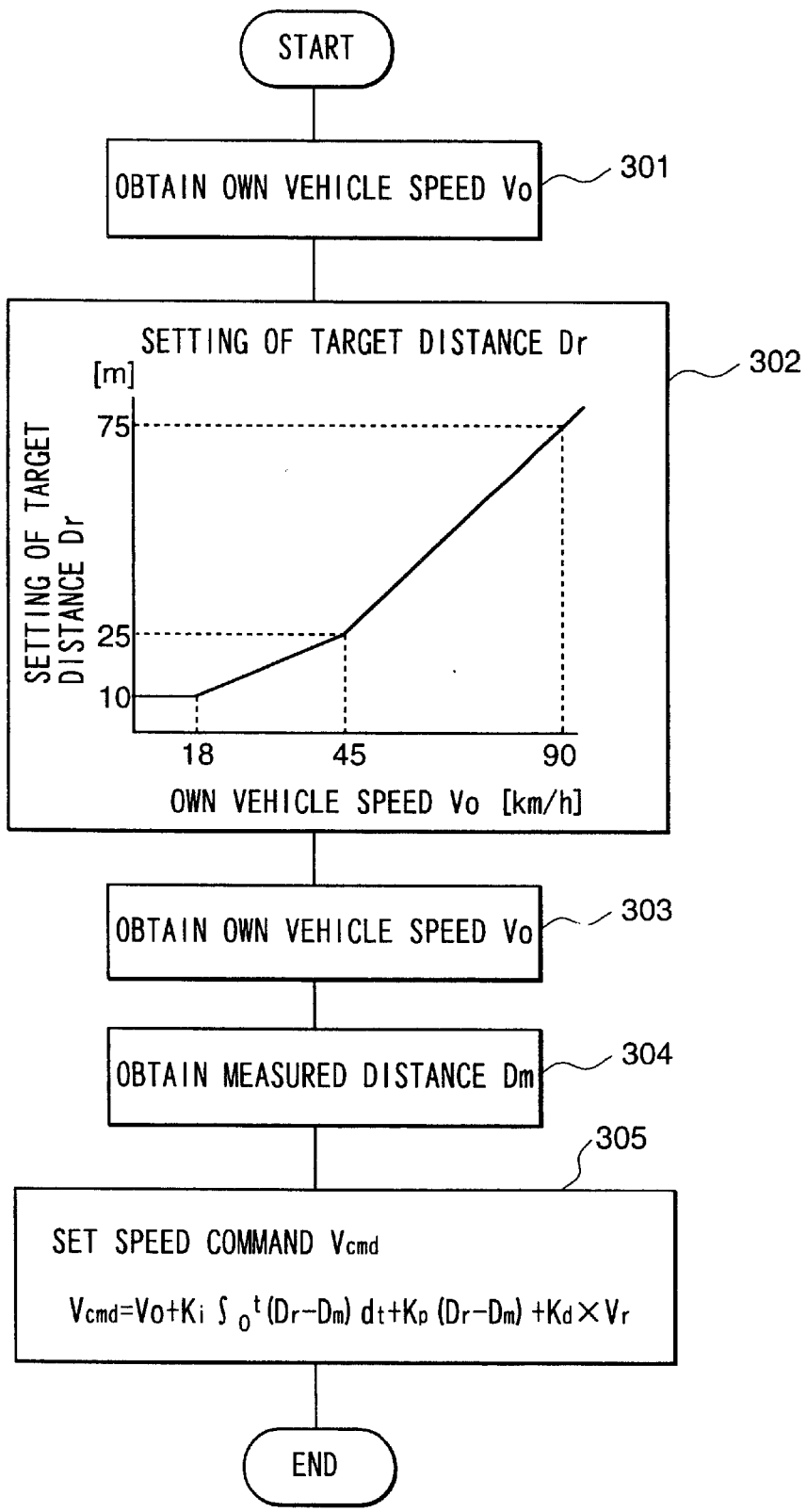
FIG. 6 is a flowchart for discussing a process of target distance setting means and speed command setting means.

At first, the process to be executed by the target distance setting portion 607 and the speed command setting means 608 will be discussed with reference to the flowchart of FIG. 6.

At step 301, the own vehicle speed Vo is taken out from the own vehicle detecting means 610. At step 602, the target distance Dr is set depending upon the own vehicle speed Vo. As these setting method, for example, when the own vehicle speed Vo is lower than 18 km/h, the target distance Dr is set at 10 m. When the own vehicle speed Vo is in a range between 18 km/h to 45 km/h, the target distance is increased from 10 m in proportion to increasing of the vehicle speed. When the own vehicle speed Vo is 45 km/h, the target distance Dr is set at 25 m. Even when the vehicle speed is higher than or equal to 45 km/h, the target distance is increased in proportion to increasing of the own vehicle speed. When the own vehicle speed is 90 km/h, the target speed is set at 75 m. As an alternate setting method, a method for deriving the target distance by multiplying the own vehicle speed Vo by a predetermined period (for example, 1 second).

At step 303, the distance Dm measured by the distance detecting means 605 is taken out. Furthermore, at step 304, the measured relative speed Vr is taken out. At step 305, the speed command Vcmd is derived from the target distance Dr, the distance Dm, the relative speed Vr and the own vehicle speed Vo by the following equation 1:

$$V_{cmd}=Vo+Ki\int_0^t (Dr-Dm)dt+Kp(Dr-Dm)+Kd\cdot Vr$$

wherein ki is a coefficient for modifying the target speed depending upon a difference between the target distance Dr and the measured distance Dm when the difference is maintained for a predetermined period, t is the predetermined period, Kp is a coefficient for modifying the target speed depending upon the difference between the target distance Dr and the measured distance Dm, Kd is a coefficient for modifying the target speed depending upon the relative speed. These values are determined by OFF line by simulation, experiments and so forth and are incorporated in a vehicle travel control program as parameters.

Figure 7:
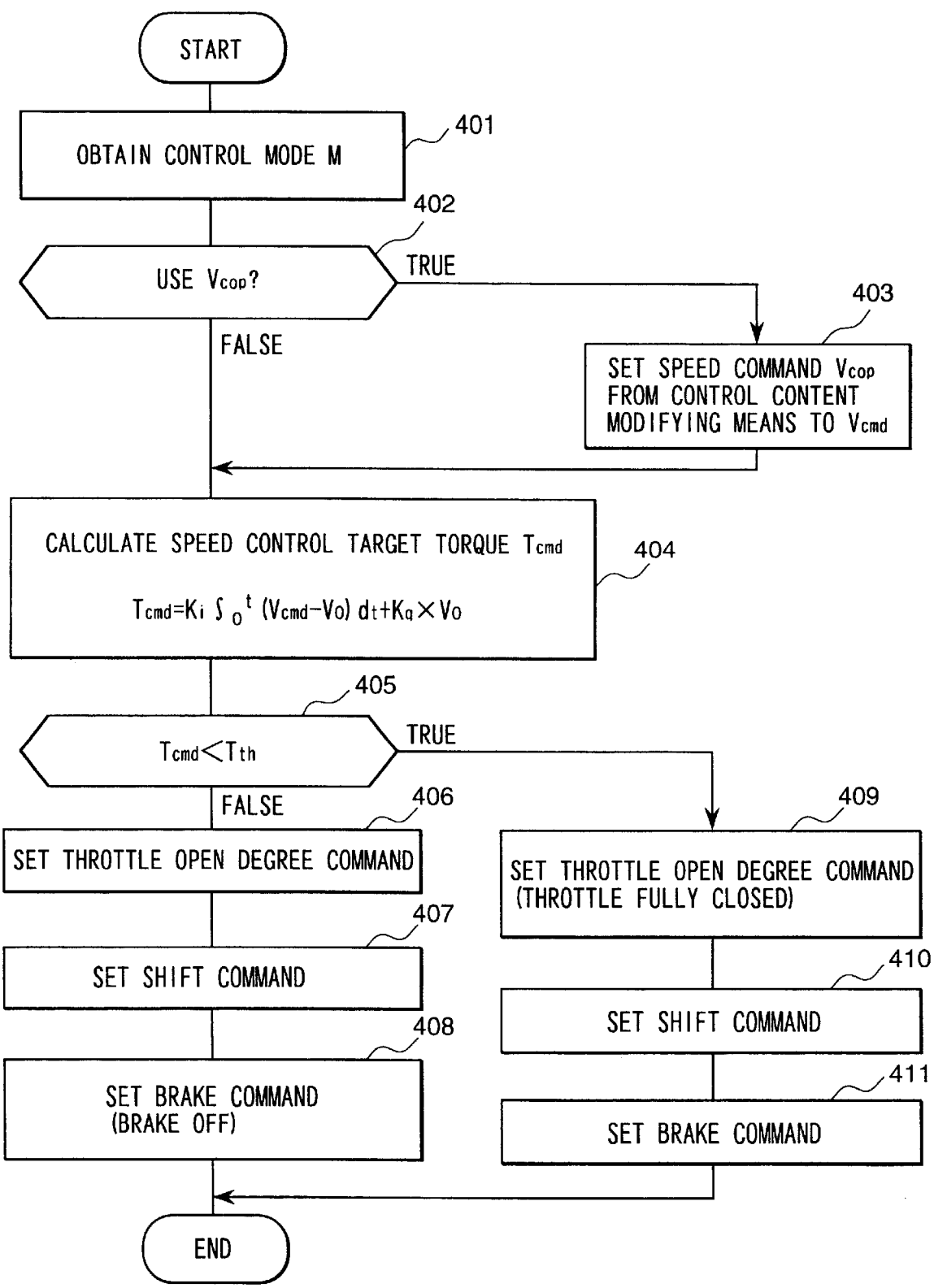
FIG. 7 is a flowchart for discussing a process of vehicle speed control means.

Concerning the process to be executed by the vehicle speed control means 609, discussion will be given with reference to the flowchart in FIG. 7. At step 401, the control mode M is taken out from the control content modifying means 5. At step 402, judgment is made whether the control mode M is designating use of the speed command Vcop generated by the control content modifying means 5. If use of the speed command Vcop is not designated, the process is advanced to step 404, and if use of the speed command Vcop is designated, the process is advanced to step 403.

At step 403, when the use of the speed command Vcop is designated, the speed command Vcop is taken out from the control content modifying means 5 and set the same as the speed command Vcmd.

At step 404, a speed control target torque Tcmd is derived by the following equation 2.

$$T_{cmd}=Kj\int_0^t (Vcmd-Vo)dt+Kq\cdot Vo$$

wherein Kj and Kq are predetermined control constants, in which Kj is a coefficient for modifying a target torque depending upon time integral (distance to move for the predetermined period at a speed of the difference) of the difference between the target speed and the own vehicle speed, and Kq is a coefficient for modifying the target torque depending upon the own vehicle speed.

At step 405, the speed control target torque Tcmd is compared with a predetermined target torque threshold value Tth. The target torque threshold value Tth is a threshold value for selecting whether the own vehicle speed Vo is to be controlled mainly using the throttle open degree command or the own vehicle speed Vo is to be controlled mainly using the brake command. When Tcmd≧Tth, a process from step 406 to step 408 is executed and when Tcmd<Tth, a process from step 409 to step 411 is executed.

When Tcmd≧Tth, acceleration control mainly using the throttle open degree command and deceleration control mainly using engine braking are performed. At step 406, the throttle open degree command is set. The throttle open degree command is set from a target engine torque and an engine revolution speed by calculating the target engine torque from a current transmission speed ratio and the speed control target torque Tcmd. This utilizes a relationship between the engine revolution speed, the throttle valve open degree and the engine torque.

Next, at step 407, a shifting command is set. When the speed command target torque Tcmd requires deceleration by engine braking, the shifting command is set for performing down-shifting. Then, at step 408, a brake command is set. Here, since it is not required to operate the brake, the brake command is set for releasing the brake.

On the other hand, when Tcmd<Tth, deceleration control is performed mainly using the brake. At step 409, since deceleration is performed by controlling the brake, the throttle open degree is set to fully close. At step 410, a transmission speed ratio of the transmission actuator 612 is set. At step 411, the brake command is set depending upon the speed command target torque Tcmd. Then, on the basis of the throttle open degree command, the throttle actuator 611 is driven. The transmission actuator 612 is driven on the basis of the shift command. The brake actuator 613 is driven on the basis of the brake command. Thus, own vehicle speed is controlled.

Next, the process to be executed by the control content modifying means will be discussed with reference to FIG. 8.

Figure 8:
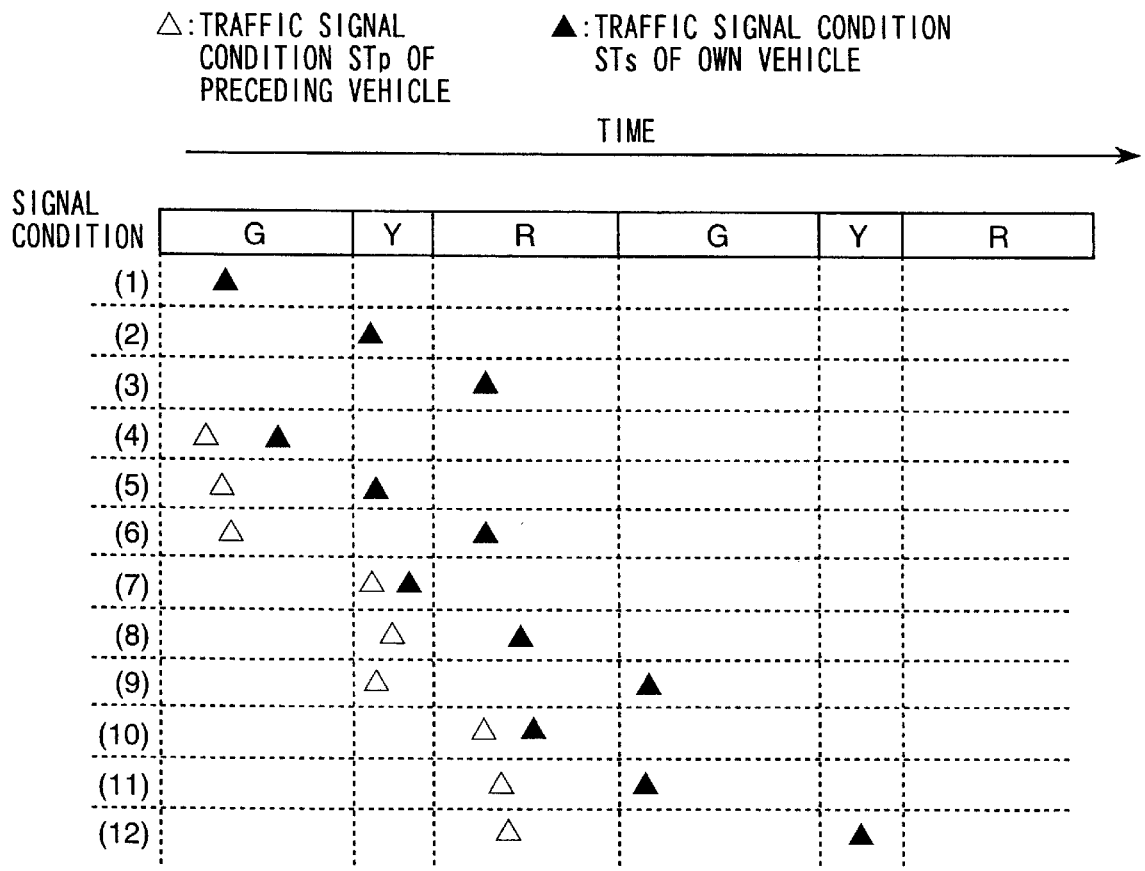
FIG. 8 is an illustration for discussing a control content modifying method.

In FIG. 8, (A) shows the condition of the traffic signal upon arrival to the intersection of the own vehicle and the preceding vehicle by ▲ and △ which can be classified into twelve states depending upon the traffic signal condition of the preceding vehicle, namely (1) to (12). Operation of the control content modifying means 5 in each state will be discussed hereinafter.

In (A) of FIG. 8, the states (1) to (3) show the condition where no preceding vehicle is present and represents the state where the own vehicle travels at low speed. In this condition, since is only required to consider the condition of the traffic signal when the own vehicle reaches the intersection, the following operation is considered as control mode M of the own vehicle. Hereinafter, the control modes M generated depending upon control states (1) to (12) generated by the control content modifying means 5 will be shown in (B) of FIG. 8.

State (1): Since the own vehicle enters into the intersection at green light, it is only required to maintain the distance control as is. Accordingly, the control mode commands to use the speed command Vcmd of the speed command setting means 608.

Figure 9:
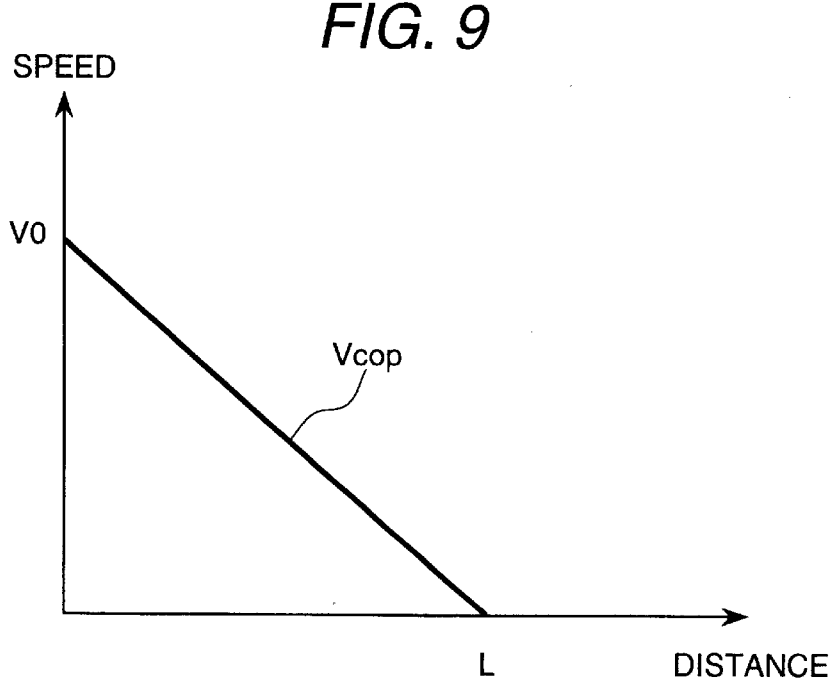
FIG. 9 is an illustration for discussing an example of a speed command Vcop generating method.

State (2): Since the own vehicle enters into the intersection at yellow light, it is required to stop at the intersection. Accordingly, the control mode M commands to use the speed command Vcop of the control content modifying means 5. As a method for generating the speed command, it is required to set the own vehicle speed zero at the intersection, for example. Therefore, a pattern shown in FIG. 9 using the intersection distance L and the own vehicle speed Vo can be considered.

State (3): Since the own vehicle enters into the intersection at red light, it is required to stop at the intersection. Accordingly, the control mode M commands to use the speed command Vcop of the control content modifying means 5. For the speed command Vcop, the same pattern as the state (2) can be used.

States (4) to (6) show the condition where the preceding vehicle enters into the intersection at green light. In these states, since the similar controls to those at states (1) to (3) are to be performed, the following operations are considered as control modes M of the own vehicle.

State (4): Since the own vehicle enters into the intersection at green light, it is only required to maintain the distance control as is. Accordingly, the control mode commands to use the speed command Vcmd of the speed command setting means 608.

State (5): Since the own vehicle enters into the intersection at yellow light, it is required to stop at the intersection. Accordingly, the control mode M commands to use the speed command Vcop of the control content modifying means 5. As a method for generating the speed command, it is required to set the own vehicle speed zero at the intersection, for example. Therefore, a pattern shown in FIG. 9 using the intersection distance L and the own vehicle speed Vo can be considered.

State (6): Since the own vehicle enters into the intersection at red light, it is required to stop at the intersection. Accordingly, the control mode M commands to use the speed command Vcop of the control content modifying means 5. For the speed command Vcop, the same pattern as the state (5) can be used.

The states (7) to (9) shows the states where the preceding vehicle enters into the intersection at the yellow light. At this condition, it can be considered a case where the preceding vehicle passes through the intersection at the yellow light and a case where the preceding vehicle stops at the yellow light. The control content modifying means 5 is required to consider the case where the preceding vehicle passes through the intersection, in view point of safety. However, upon generating the speed command Vcop, it may be generated in consideration that the preceding vehicle stops at the intersection. Accordingly, as the control modes M of the own vehicle, the following operations are considered.

Figure 10:
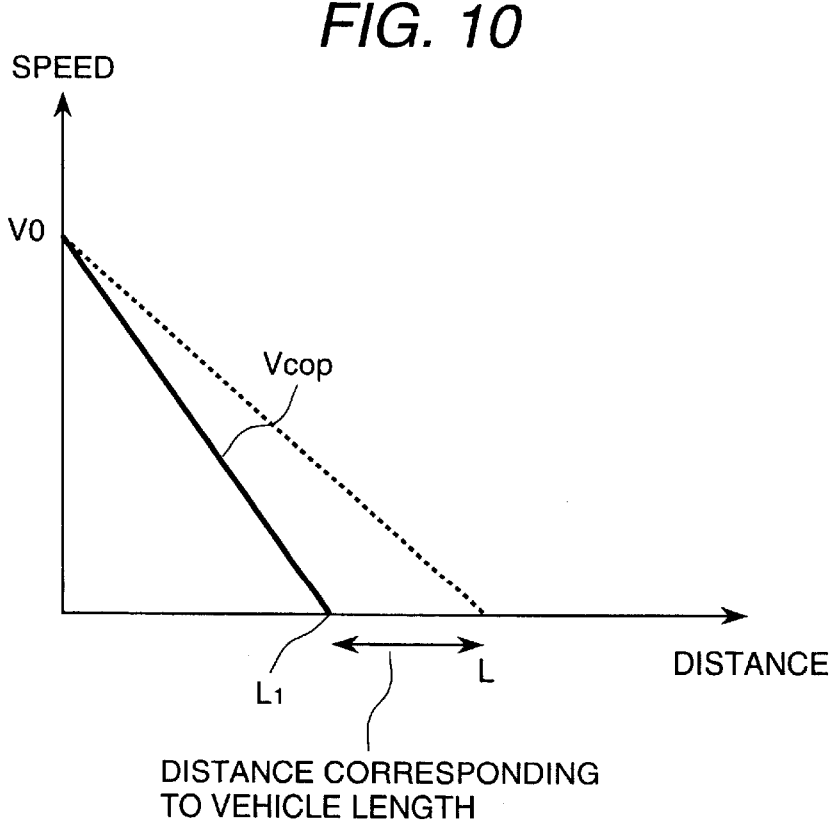
FIG. 10 is an illustration for discussing another example of a speed command Vcop generating method.

State (7): Since the own vehicle enters into the intersection at the yellow light, it is required to stop at the intersection. Accordingly, the control mode M commands to use the speed command Vcop of the control content modifying means 5. As a generation method of the speed command Vcop, similar consideration as the states (5) and (6) is taken, and in consideration that the preceding vehicle stops at the intersection, the own vehicle speed is set to be zero at a point L1 derived by subtracting a value taking the vehicle length of the preceding vehicle into account from the intersection distance L as shown in FIG. 10, for example. As the vehicle length of the preceding vehicle, the vehicle length of a full size vehicle is programmed as default length, or in the alternative, when the traffic signal characteristics obtaining means 1 is constructed with the image pick-up device and the image processing device, the number plate of the preceding vehicle is recognized to discriminate the kind of the preceding vehicle to use the vehicle length depending a-upon the kind of the preceding vehicle.

State (8): Since the own vehicle enters into the red light, it is required to stop at the intersection. Accordingly, the control mode M commands to use the speed command Vcop of the control content modifying means 5. For the speed command Vcop, the same pattern as the state (7) can be used.

State (9): Since the own vehicle enters into the intersection at green light to pass, the distance control can be maintained as is. If the preceding vehicle stops at the yellow signal, the distance control will work. Accordingly, the control mode M command to use the speed command Vcmd of the speed command setting means 608.

States (10) to (12) show the condition where the preceding vehicle enters into the intersection at red light. At this time, it can be considered that the preceding vehicle stops at the intersection, the own vehicle may maintain the distance control. Accordingly, as all of control mode M of states (10) to (12), it is commanded to use the speed command Vcmd of the speed command setting means 608.

In FIG. 8, as taking that traffic signal conditions of the green light, the yellow light and the read light one cycle, consideration has been given for the case where the traffic signal conditions of the preceding vehicle and the own vehicle falls within one cycle. However, it is possible that the traffic signal conditions of the preceding vehicle and the own vehicle extend over two cycles. It should be noted that, in this case, since it can be considered that a distance to the preceding vehicle is sufficient, it may be possible to perform cruise control or travel control with maintaining distance control until the traffic signal conditions of the preceding vehicle and the own vehicle falls within one cycle as shown in FIG. 8.

On the other hand, when the control content modifying means 5 varies the travel control mode M, the control signal Sa (FIG. 1) is generated in order to generate an alarm for notifying this fact to output to the alarm means 7.

Figure 11:
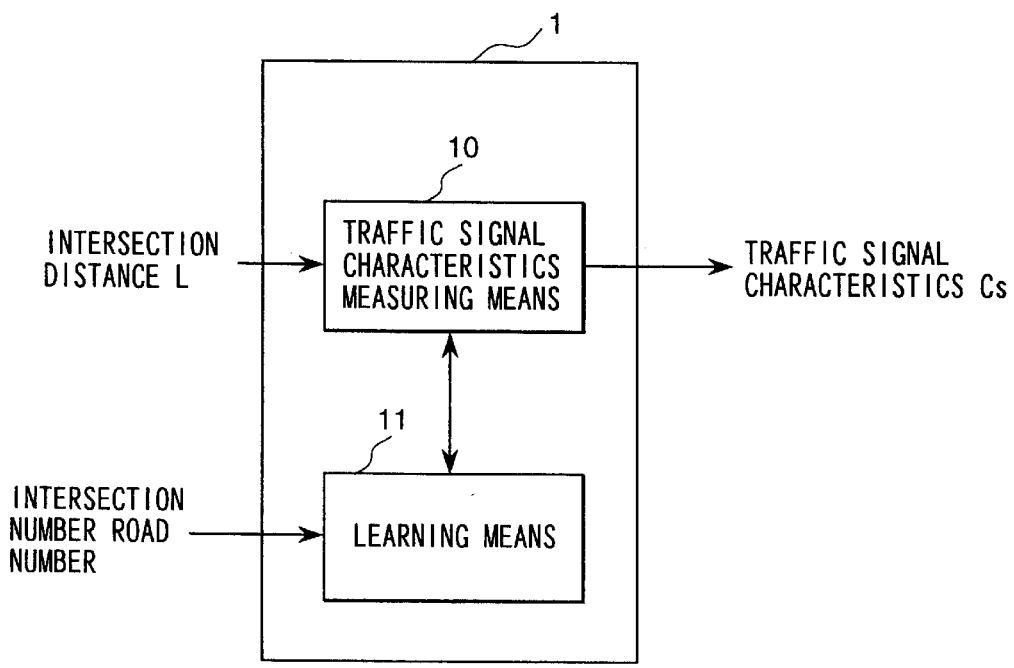
FIG. 11 is a block diagram for discussing a constriction of traffic signal characteristics obtaining means.

The traffic signal characteristics obtaining means 1 shown in FIG. 1 for obtaining the characteristics of the traffic signal (for example, among one cycle of the green light, the yellow light and the red light, red light period Tr, green light period Tb, yellow light period Ty and an elapsed time T from beginning of a signal condition cycle to a current time) is constructed as shown in FIG. 11, for example. The traffic signal characteristics obtaining means 1 has a traffic signal characteristics measuring means 10 and a learning means 11. In the traffic signal characteristics measuring means 10, the characteristics of the traffic signal is measured. On the other hand, in the learning means, the traffic signal characteristics measured by the traffic signal characteristics measuring means 10 is stored together with the intersection number or the road number. When the traffic signal characteristics measuring means 10 cannot measure the traffic signal characteristics, or measurement is difficult, the stored traffic signal characteristics preliminarily stored is read out by the learning means 11 on the basis of the intersection number or the road number.

Figure 12:
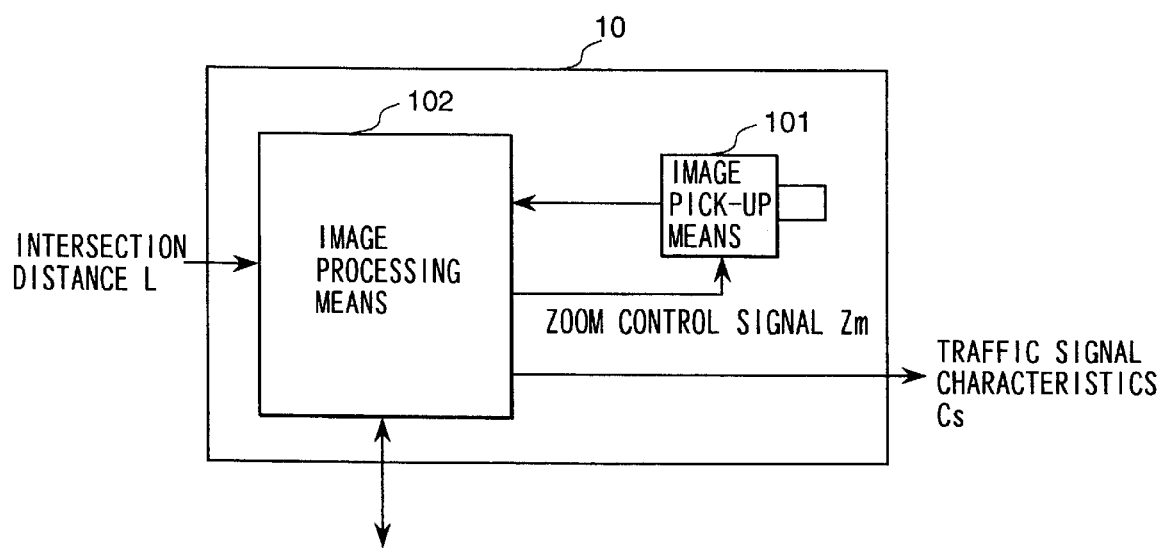
FIG. 12 is a block diagram for discussing a constriction of traffic signal characteristics obtaining means.

The traffic signal characteristics measuring means 10 is considered to be constructed as shown in FIG. 12. In FIG. 12, there is provided the image pick-up means 10 for picking up image relating to travel of own vehicle and the image processing means 102 for processing the image picked up by the image pick-up means 101. In the construction of FIG. 12, as a method for measuring the traffic signal characteristics, color information of green, yellow and red is detected from the image picked up by the image pick up means 101 to recognize the traffic signal by making judgment whether the arrangement of green, yellow and red is the same as the traffic signal or not. Then, by performing this process for sequence of images, each period of the green light, the yellow light and the red light are measured. The measured traffic signal characteristics is output to the traffic signal condition estimating means 4, and in conjunction there with to output to the learning means 11. For example,when the image pick-up means 101 cannot pick up the image of the traffic signal for presence of the large size vehicle in front of the own vehicle, the traffic signal characteristics is read out from the learning means 11 to output the read out information. On the other hand, when a distance to the intersection is long, the image of the traffic signal picked up is small.

Therefore, by using a lens having a zooming mechanism, a magnification of the zooming mechanism depending upon the distance to the lens is derived to generate a zoom control signal Zm to control the zoom lens.

Figure 13:
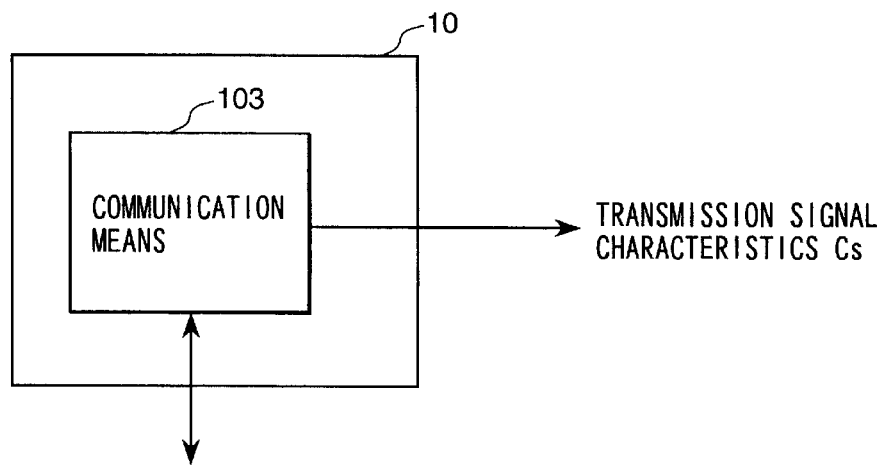
FIG. 13 is a block diagram for discussing another constriction of traffic signal characteristics obtaining means.

Another construction of the traffic signal characteristics measuring means 10 is shown in FIG. 13. The construction of FIG. 13 is to obtain the characteristics of the traffic signal from the traffic signal installed on the road or the control unit thereof through the communication means. The traffic signal characteristics measuring means 10 can be realized by the communication means 103 using radio wave or light. In the communication means, the measured traffic signal characteristics Cs is output to the traffic signal condition estimating means 4 and also to the learning means 11.

The learning means 11 can be realized using a memory, for example.

Figure 14:
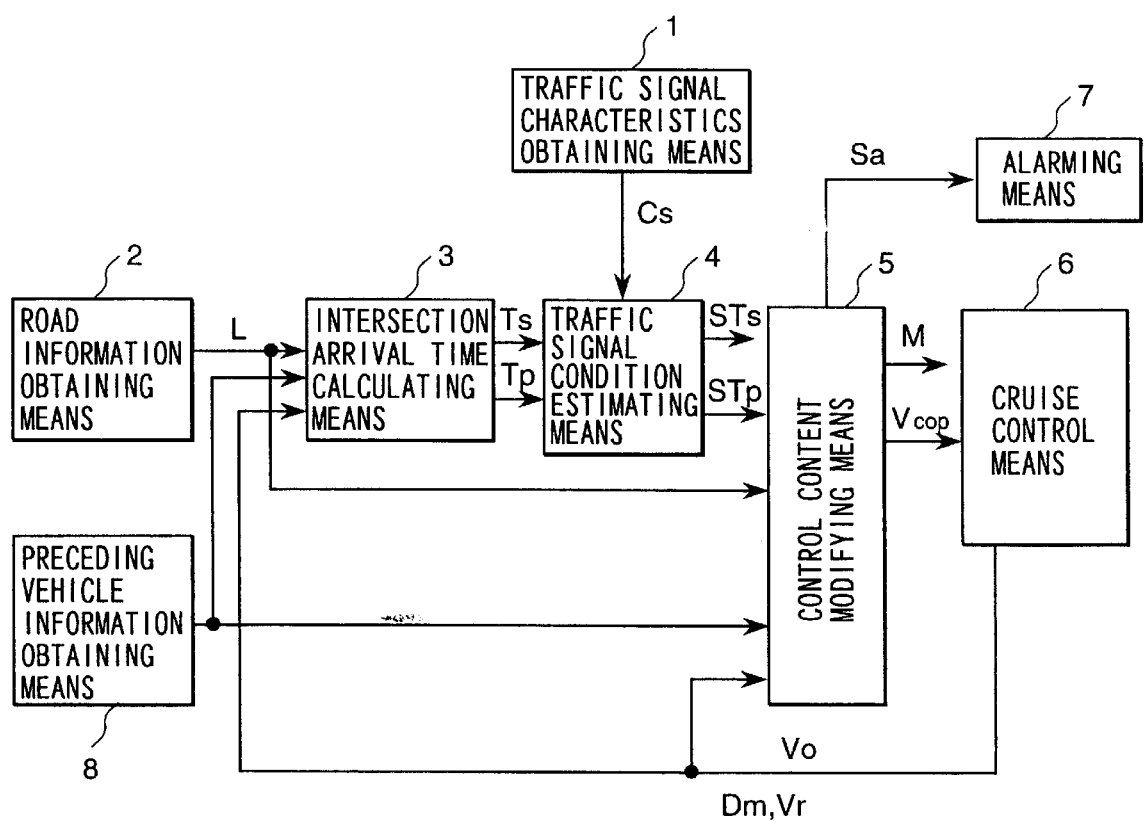
FIG. 14 is a block diagram showing another construction of the cruise control system for the automotive vehicle according to the present invention.
Figure 15:
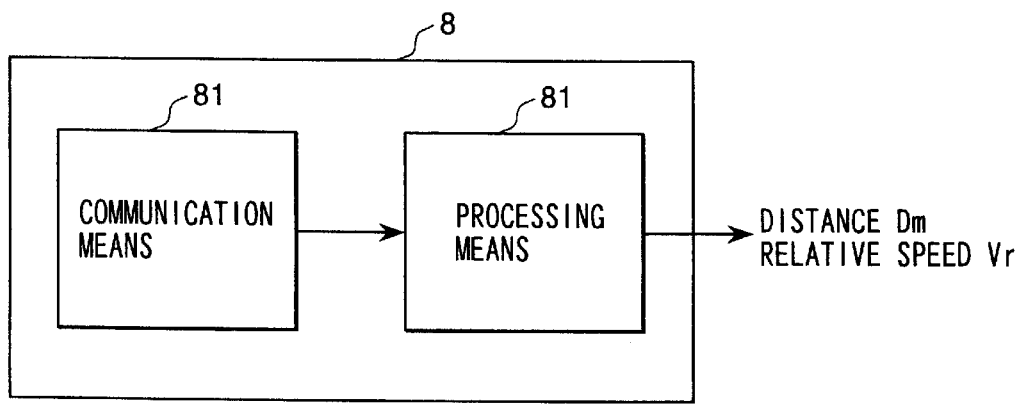
FIG. 15 is a block diagram showing a construction of preceding vehicle information obtaining means.

In the embodiment of the present invention shown in FIG. 1, a traveling condition (distance and relative speed) of the preceding vehicle is obtained from the cruise control means 6. However, it is also possible to have a construction shown in FIG. 14 as a further embodiment of the present invention. The embodiment shown in FIG. 14 is to obtain the traveling condition of the preceding vehicle from the control unit installed on the road, and is provided with preceding vehicle information obtaining means 8 in addition to the embodiment of FIG. 1. The preceding vehicle information obtaining means 8 can be constructed with communication means 81 and processing means 82 as shown in FIG. 15. The communication means 81 receives traveling condition of the preceding vehicle from the control unit on the road using the radio wave or light. The processing means 82 outputs the traveling condition of the received preceding vehicle to the intersection arriving time measuring means 3.

When the embodiment shown in FIG. 14 is used, it becomes possible to obtain traveling condition of a plurality of preceding vehicles traveling around the own vehicle from the control unit on the road. In this case, since the intersection arriving time and the traffic signal condition can be estimated for the vehicle traveling ahead of the preceding vehicle which the own vehicle follows. Therefore, further precise control can be realized to contribute for improvement of riding comfort.

Figure 16:
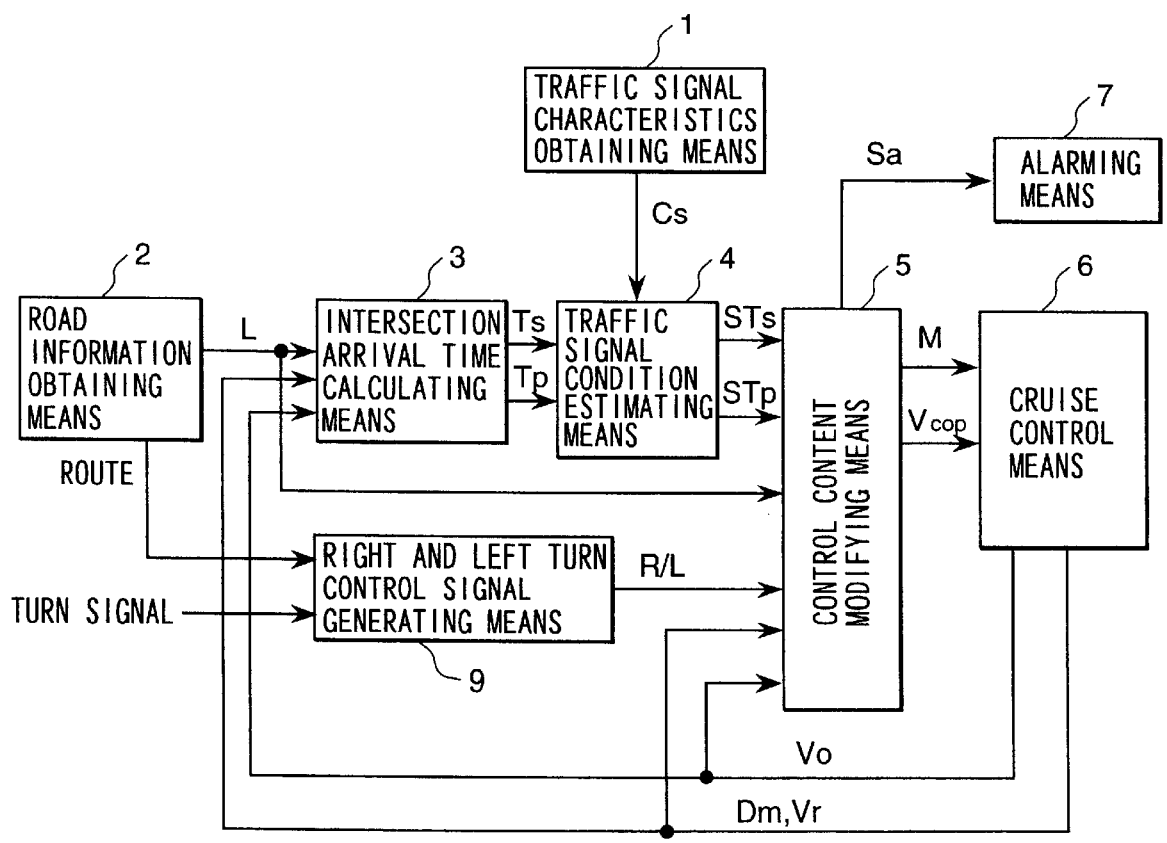
FIG. 16 is a block diagram showing a further construction of the cruise control system for the automotive vehicle according to the present invention.

Furthermore, as the embodiment for realizing the present invention, a construction shown in FIG. 16 is considered, for example. In the embodiment shown in FIG. 16, it is intended to control own vehicle in consideration of the vehicles coming from the opposite direction and foot passengers or the like when the own vehicle turns right or left in the intersection. Therefore, in addition to the construction of the embodiment of FIG. 1, left and right turn control signal generating means 9 is provided. The left and right turn control signal generating means may also be provided in the embodiment shown in FIG. 14.

The left and right turn control signal generating means 9 receives state of a turn signal and a route information (go straight, to turn right or to turn left) to the destination generated by the road information obtaining means to generate right or left turn control signal R/L when at least one of the state of the turn signal and the route information indicates right turn or left turn to output to the control content modifying means. The right or left turn control signal R/L has a pattern that R/L=0 when own vehicle has to go straight through the intersection, R/L=1 when the own vehicle has to turn right in the intersection and R/L=2 when the own vehicle has to turn left in the intersection. The control content modifying means 5 modifies the content of cruise control of the own vehicle on the basis of the value of the right or left control signal R/L. For example, the operating conditions (1) to (12) of the control content modifying means 5 depending upon signal condition of the own vehicle and the preceding vehicle is only for the case of R/L=0 (straight). When R/L=1 or 2, an alarm for announcing necessity of checking the vehicles coming from the opposite direction and foot passengers for the driver. Also, the speed command generate the control mode M to use the speed command Vcop generated by the control content modifying means 5. The control mode of the control content modifying means 5 is shown in FIG. 17 corresponding to the right and left turn control signal R/L.

With the present invention, upon traveling on the ordinary road following the preceding vehicle, entering into the intersection at the yellow light following the preceding vehicle can be avoided to permit traveling of the driver without causing fear of insecurity.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A cruise control system for an automotive vehicle, for controlling cruising of own vehicle with maintaining a distance to a preceding vehicle constant, comprising:

traffic signal characteristics obtaining means for obtaining characteristics of a traffic signal ahead;

road information obtaining means for obtaining intersection information including a distance to an intersection;

intersection arrival time calculating means for calculating arrival timing of the own vehicle and/or the preceding vehicle on the basis of a distance to the intersection, an own vehicle speed and/or a preceding vehicle traveling condition;

traffic signal condition estimating means for estimating said condition of the traffic signal on the basis of the traffic signal characteristics and said intersection arrival timing; and control content modifying means for modifying a content of cruise control of the own vehicle depending upon said estimated traffic signal condition.

2. A cruise control system for an automotive vehicle as set forth in claim 1, wherein communication means is provided in said traffic signal characteristics obtaining means for obtaining said traffic signal condition or traveling condition of said preceding vehicle.

3. A cruise control system for an automotive vehicle as set forth in claim 1, further comprising right and left turn control signal generating means for generating operation pattern of the own vehicle from a state of turn signal or a route information to a destination generated by said road information obtaining means to input to said control content modifying means.

4. A cruise control system for an automotive vehicle as set forth in claim 1, wherein said traffic signal characteristics obtaining means includes traffic signal characteristics measuring means for measuring characteristics of the traffic signal and traffic signal characteristics learning means for learning a traffic signal characteristics measured by the traffic signal characteristics measuring means.

5. A cruise control system for an automotive vehicle as set forth in claim 4, wherein said traffic signal characteristics learning means learns intersection information from said road information obtaining means with correspondence to the intersection information.

6. A cruise control system for an automotive vehicle, for controlling cruising of own vehicle with maintaining a distance to a preceding vehicle constant, comprising:

traffic signal characteristics obtaining means including image pick-up means having zooming means, image processing means obtaining traffic signal characteristics by processing an image of said image pick-up means and communication means, for serving as measuring means for obtaining characteristics of a traffic signal ahead;

road information obtaining means for obtaining intersection information including a distance to an intersection ahead;

intersection arrival time calculating means for calculating arrival timing of the own vehicle and/or the preceding vehicle on the basis of a distance to the intersection, an own vehicle speed and/or a preceding vehicle traveling condition;

traffic signal condition estimating means for estimating said condition of the traffic signal on the basis of the traffic signal characteristics and said intersection arrival timing;

right and left turn control signal generating means for generating operation pattern of the own vehicle from a state of turn signal or a route information to a destination generated by said road information obtaining means to input to said control content modifying means;

control content modifying means for modifying a content of cruise control of the own vehicle depending upon said estimated traffic signal condition; and alarm means for generating a corresponding alarm before modifying the content of the cruise control.

7. A cruise control system for an automotive vehicle as set forth in claim 1, wherein an alarm is generated before modifying the content of the cruise control.

8. A cruise control system for an automotive vehicle as set forth in claim 2, wherein an alarm is generated before modifying the content of the cruise control.

9. A cruise control system for an automotive vehicle as set forth in claim 3, wherein an alarm is generated before modifying the content of the cruise control.

10. A cruise control system for an automotive vehicle as set forth in claim 4, wherein an alarm is generated before modifying the content of the cruise control.

11. A cruise control system for an automotive vehicle as set forth in claim 5, wherein an alarm is generated before modifying the content of the cruise control.

12. A cruise control system for an automotive vehicle as set forth in claim 6, wherein an alarm is generated before modifying the content of the cruise control.

13. A cruise control system for an automotive vehicle, for controlling cruising of a vehicle while maintaining a distance to a preceding vehicle constant, comprising:

traffic signal characteristics obtaining means for obtaining characteristics of a traffic signal ahead representing switching timing between a green lamp and a red lamp of the traffic signal;

road information obtaining means for obtaining intersection information including a distance to an intersection;

intersection arrival time calculating means for calculating arrival timing of the vehicle and/or the preceding vehicle on the basis of a distance to the intersection, a speed of the vehicle and/or a preceding vehicle traveling condition;

traffic signal condition estimating means for estimating said condition of the traffic signal on the basis of the traffic signal characteristics and said intersection arrival timing; and control content modifying means for modifying a content of the cruise control of the vehicle depending upon said estimated traffic signal condition.

14. A method for operating a cruise control system of an automotive vehicle, the method comprising the acts of:

obtaining characteristics of a traffic signal ahead of the vehicle, said characteristics representing switching times between a green lamp and a red lamp of the traffic signal;

obtaining intersection information on a road network, including a distance to an upcoming intersection;

calculating arrival timing of the vehicle and/or a preceding vehicle to the upcoming intersection based on a distance to the intersection, a speed of the vehicle and/or a traveling condition of the preceding vehicle;

estimating a condition of the traffic signal on the basis of the traffic signal characteristics and the intersection arrival timing; and modifying operation of the cruise control system of the vehicle depending upon the estimated condition of the traffic signal.

* * * * *